Patented Sept. 28, 1948

2,450,334

UNITED STATES PATENT OFFICE 2,450,334

PRODUCTION OF ARYL SUBSTITUTED ETHYLENIC COMPOUNDS

James Kenneth Dixon, Riverside, and Donald R. May, Stamford, Conn., assignors to American Cyanamid Company, New York, N. Y., a corporation of Maine No Drawing. Application August 21, 1945, Serial No. 611,925

6 Claims. (Cl. 260—668)

This invention relates to the production of ethylenic compounds having two aryl groups attached to the same carbon atom and particularly, to the production of those compounds having the two aryl groups attached to a carbon atom of the ethylenic compound which is in turn attached to the rest of the ethylenic compound by a carbon-to-carbon double bond. The invention also relates to the production of other aryl compounds along with the aforementioned substituted ethylenic compounds.

The patent of Murray Gray Sturrock and Thomas Lawe, No. 2,373,982 which issued April 17, 1945, discloses the production of converting asymmetric diaryl paraffins having at least two carbon atoms in the paraffin chain into other aromatic compounds, one of which has a side chain containing an ethylenic linkage, by contacting an asymmetric diaryl substituted paraffin with a catalyst at elevated temperatures, said catalyst being one which promotes simple molecular decomposition. For this purpose the patentees mention hydrated aluminum silicate catalysts.

An object of the present invention is to convert the diaryl substituted paraffins having at least two carbon atoms in the paraffin chain and in which both aryl groups are attached to the same carbon atom, and their nuclear substituted derivatives, into diaryl substituted ethylenic compounds alone or along with some monoaryl compounds.

This and other objects are attained by heating an asymmetric diaryl paraffin of the aforementioned type or a nuclear substituted derivative thereof to a temperature of about 400–650° C. in the presence of a catalyst which comprises a metal having an atomic number between 23 and 29. The preferred catalysts are the metal chromites including beryllium, nickel and copper chromites. It is preferable that the contact time be between 0.001 and 0.5 second. Furthermore, it is preferable that the diaryl substituted paraffin be mixed with a diluent such as water vapor before it is passed over the heated catalyst. Water vapor is particularly desirable inasmuch as it is easily removed from the product by condensation and, inasmuch as it often assists in maintaining the catalyst in a highly active condition.

The following examples in which the proportions are in parts by weight are given by way of illustration and not in limitation. The diarylethane employed in the following examples is 1,1-di-p-tolylethane.

Example 1

600 parts of a catalyst having about 10% of nickel supported on activated alumina (catalyst "A") are packed into a suitable converter tube and the tube is heated and maintained at a temperature of about 500–550° C. About 870 parts of ditolylethane are mixed with water vapor and passed through the tube at the rate of about 293 parts of ditolylethane per hour and at the rate of 2670 parts of water per hour. About 860 parts of hydrocarbon condensate are obtained and this is distilled to yield about 10 parts of a light boiling oil boiling below about 200° C. and about 840 parts of a heavy oil boiling between about 200° C. and about 350° C. leaving about 10 parts of a high boiling residue.

The heavy oil is analyzed by titrating it with a potassium bromide-bromate solution and it is found to contain about 76 parts of 1,1-di-p-tolylethylene. This analysis is corroborated by the chemical reaction of the product with bromine and the behavior of the resulting dibromide in splitting out HBr upon heating and by Raman spectra.

The ditolylethylene may be separated from the heavy oil by any suitable means such as by fractional distillation, fractional crystallization or by a combination of both. Furthermore, if desired, a solvent may be added to the heavy oil and the resulting mixture azeotropically distilled or else the components may be separated by extractive distillation, depending on the nature of the added material.

Example 2

About 700 parts of a copper chromite-alumina catalyst (catalyst "B") are packed into a converter tube heated and maintained at about 500–550° C., 840 parts of ditolylethane are passed through the tube at the rate of 372 parts per hour, together with water vapor at the rate of 2750 parts per hour. About 840 parts of hydrocarbon condensate are obtained, and upon distillation about 20 parts of a light oil boiling below 200° C. are separated therefrom, together with about 760 parts of a heavy oil boiling between 200° C. and 350° C., leaving a high boiling residue amounting to about 10 parts with a distillation loss of about 50 parts of material.

On analysis in the same manner as described in Example 1, the heavy oil is found to contain 292 parts of 1,1-di-p-tolylethylene.

Example 3

About 650 parts of a catalyst comprising about

6% iron on alumina (catalyst "C") are packed into a reaction tube, heated and maintained at about 500–550° C. About 880 parts of ditolylethane are passed through the tube at the rate of 279 parts per hour together with water vapor at the rate of 2470 parts per hour. About 860 parts of hydrocarbon condensate are obtained which, on distillation, yields 10 parts of light oil boiling below 200° C. and 830 parts of a heavy oil boiling between 200 and 350° C., together with about 20 parts of a high boiling residue. The heavy oil contains about 177 parts of 1,1-di-p-tolylethylene when analyzed in accordance with the procedure described in Example 1.

*Example 4*

About 600 parts of a catalyst comprising about 10% of copper on alumina (catalyst "D") are packed into a converter tube, heated and maintained at a temperature of 500–550° C. 940 parts of ditolylethane are passed through the tube at the rate of about 254 parts per hour together with water vapor at the rate of 2490 parts per hour. About 920 parts of hydrocarbon condensate are obtained which is distilled to yield about 20 parts of a light oil boiling below 200° C., together with 870 parts of a heavy oil boiling between 200° C. and 350° C., leaving a residue of about 10 parts of high boiling material with a distillation loss of about 20 parts of material. The heavy oil contains about 54 parts of 1,1-di-p-tolylethylene when analyzed in accordance with the procedure of Example 1.

*Example 5*

600 parts of a catalyst comprising 10% of cobalt on alumina (catalyst "E") are packed into a reaction tube, heated and maintained at about 500–550° C. About 1000 parts of ditolylethane are passed through the tube at the rate of 316 parts per hour together with water vapor at the rate of 2560 parts per hour. About 980 parts of hydrocarbon condensate are obtained and upon distillation about 10 parts of a light oil boiling below 200° C. together with 950 parts of a heavy oil boiling between 200° C. and 350° C. are obtained, leaving a residue of about 10 parts of high boiling material with a distillation loss amounting to about 10 parts of material. The high boiling oil contains about 51 parts of 1,1-di-p-tolylethylene when analyzed in accordance with the procedure of Example 1.

*Example 6*

About 400 parts of a catalyst comprising about 12% of $Cr_2O_3$ on alumina (catalyst "F") are packed into a reaction tube, heated and maintained at about 500–550° C. 870 parts of ditolylethane are passed through the tube at the rate of about 268 parts per hour together with water vapor at the rate of 2480 parts per hour. About 840 parts of hydrocarbon condensate are obtained, and upon distillation, this yields about 40 parts of a light oil boiling below 200° C. together with about 790 parts of a heavy oil boiling between 200° C. and 350° C., leaving a residue of 10 parts of a high boiling material. Upon analysis of the heavy oil, in accordance with the procedure described in Example 1, it is found to contain about 60 parts of 1,1-di-p-tolylethylene.

*Example 7*

About 600 parts of a catalyst comprising 10% of vanadium penta-oxide on alumina (catalyst "G") are packed into a converter tube, heated and maintained at about 500°–550° C. About 900 parts of ditolylethane are passed through the tube at the rate of about 289 parts per hour, together with water vapor at the rate of 2650 parts per hour. About 840 parts of a hydrocarbon condensate are obtained, and, upon distillation, this yields about 70 parts of a light oil boiling below 200° C., together with 700 parts of a heavy oil boiling between 200° C. and 350° C. Upon analysis of the heavy oil, in accordance with the procedure of Example 1, it is found to contain about 162 parts of 1,1-di-p-tolylethylene.

*Preparation of catalyst "A"*

About 50 parts of nickel nitrate hexahydrate are dissolved in about 50 parts of water and poured over about 90 parts of activated alumina. The excess liquid is drawn off and the residue is dried at about 110° C. About 25 parts of water are added to the solid which remains after evaporating the liquid portion which was drawn off. The resulting solution is just sufficient to wet the dried alumina and then the two are mixed together. The mixture is dried at about 110° C., and ignited at about 500° C., to produce a catalyst containing about 10% Ni.

*Preparation of catalyst "B"*

200 parts of activated alumina are saturated with a solution containing 30 parts of $$Cu(NO_3)_2.6H_2O$$

dissolved in 50 parts of water and dried at about 110° C. The dried product is then saturated with a solution containing 30 parts of $(NH_4)_2Cr_2O_7$,  dissolved in about 60 parts of water and 30 parts of an aqueous solution of ammonium hydroxide (specific gravity 0.9015). The product is then dried at about 110° C.

*Preparation of catalyst "C"*

The same procedure is employed as in the preparation of catalyst "A" except that 43 parts of $Fe(NO_3)_3.9H_2O$ are used in place of the nickel nitrate.

*Preparation of catalyst "D"*

A catalyst such as catalyst "D" may be prepared in accordance with the procedure described in connection with the preparation of catalyst "A" except that 47 parts of $Cu(NO_3)_2.6H_2O$ are used in place of the nickel nitrate.

*Preparation of catalyst "E"*

The preparation of a catalyst of this type is carried out in the same manner as described in Example 1 except that 22 parts of $CoCl_2$ is substituted for the nickel nitrate.

*Preparation of catalyst "F"*

The procedure for the preparation of catalyst "A" is followed substituting 20 parts of $$(NH_4)_2CrO_4$$

for the nickel nitrate.

*Preparation of catalyst "G"*

About 90 parts of freshly precipitated and washed $Al_2O_3$ wet gel and 13 parts of $NH_4VO_3$ are thoroughly mixed in a ball mill. The wet cake is then dried at about 110° C., heated to about 650° C., for 4 hours and finally ground into particles having a diameter of about 0.3 cm.

The ditolylethylene contained in the heavy oil as prepared in accordance with the above examples may be separated therefrom by any type of fractional distillation, fractional crystallization, 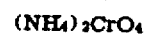 or more preferably, by a combination of both.

Furthermore, the ditolylethylene may be separated from the heavy oil by solvent extraction or by chemical means if desired.

Other catalysts which may be used in accordance with the present invention are ferric oxide, nickel chromite, copper-nickel chromite, beryllium chromite, copper oxide-cobalt oxide, etc. In view of the fact that relatively high conversion to the ethylenic compound is obtained when the chromite catalysts are used the use of the chromite catalysts is preferred.

The catalysts may include other materials which activate them, or which are entirely inert and are used merely to extend the surface of the catalysts. Thus, the catalysts employed in the preceding examples may be substituted with catalysts having supports or carriers other than alumina, or the alumina or other carrier may be eliminated entirely. The catalysts may be supported on finely divided materials, e. g., silicon carbide, non-porous aluminum oxide, highly fired ceramic materials in the form of rings, saddles, grids, etc. Binding agents such as sodium silicate may be advantageously used in some cases to improve the chemical stability of the catalysts.

The catalyst is employed in a finely divided condition the particles of which are preferably no larger than about 5 mm. in their greatest diameter. The particles may be of any desired shape such as cubical, spherical or of an irregular granular shape. In general, it is desirable to have the particles as fine as possible, but the particle size should not be so small that the catalyst packs thereby causing the vapors to channel through the catalyst instead of passing through in a uniform manner.

The converter into which the catalyst is placed may be a tube constructed of steel, silica, or any other suitable material. In a large-scale process the converter may comprise a plurality of such tubes, or it may be a shell-type of converter having one or more layers or trays of catalyst therein. The converter may be heated by any desired means such as by electrical resistance heating elements. It is preferable that the reacting materials and diluent, if such be used, be preheated to a temperature somewhere near the desired reaction temperature.

Among the asymmetric diaryl paraffins and the like which may be converted into ethylenic compounds in accordance with the present invention the following are a few examples: 1,1-diphenylethane, each of the 1-phenyl-1-tolylethanes, each of the 1,1-ditolylethanes, each of the 1-phenyl-1-xylylethanes, each of the 1-tolyl-1-xylylethanes, each of the 1,1-dixylylethanes, 1,1-diphenylpropane, each of the 1-phenyl-1-tolylpropanes, each of the 1,1-ditolylpropanes, each of the 1-tolyl-1-xylylpropanes, each of the 2,2-ditolylpropanes, each of the 1,1-di-(monochlorophenyl)-ethanes, each of the 1,1-di-(dichloropheynl)-ethanes, each of the 1,1-di-(monohydroxy phenyl)-ethanes, each of the 1,1-dicresylethanes, each of the 2,2-dicresylpropanes, each of the 1,1-dinaphthylethanes, each of the 1,1-dixenylethanes, each of the 1-tolyl-1-naphthylethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta or para positions and when two of these groups are present they may be attached in the same or different positions.

The reaction temperature may be varied from about 400° C. up to about 600° C. or even higher in some cases. Temperatures above 600° C. cause some pyrolysis loss and therefore are generally undesirable. If the contact time is very low temperatures in the neighborhood of 600° C. are preferably used. The contact time is kept as low as possible when high temperatures are employed in order to avoid an undesired amount of pyrolysis loss or losses due to side-reactions. Among the side-reactions there are those which lead to the formation of anthracene derivatives.

Any material which is volatile and which does not react with the diaryl substituted paraffin, nor with the products formed from the diaryl substituted paraffin may be used as diluent. Among these, some examples are water, the hydrocarbons (such as benzene and toluene), the fixed gases (such as nitrogen and carbon dioxide), etc. Water vapor is the preferred diluent inasmuch as it may be readily condensed and thereby separated from the products of reaction whereas, the fixed gases or the hydrocarbons are somewhat more difficult to separate from the product and such separation requires higher expenditures than are required for the separation of water from the product. Water vapor also has an additional advantage in that it may maintain the catalyst in highly active form.

One of the most important reasons for the use of a diluent is that the time of contact of the diaryl substituted paraffin with the catalyst can be reduced to the desired point easily. It has been found that in order to obtain short contact times which are desirable in accordance with the present invention the molal ratio of diluent to the diaryl substituted hydrocarbon in the feed to the catalyst is preferably about 10:1 up to 150:1 or more. Furthermore, the use of a high ratio of diluent such as water vapor is desirable, inasmuch as this appears to favor the dehydrogenation reaction.

In most dehydrogenation reactions the contact time employed is relatively long. However, in the present case we have found that low contact times are desirable and, accordingly, prefer to use contact times of less than 0.5 second. In order to avoid practical difficulties it is generally desirable to employ contact time of about 0.001 second, or more. While it is preferable to have the contact time quite low we have found that for most purposes the optimum contact time is from about 0.05 second to about 0.1 second. The contact time employed in the foregoing examples is about 0.11–0.12 second.

The calculation of the contact time of the vapor with catalyst is a relatively complex matter and in order to simplify this calculation we have used the term "contact time" herein to mean those values which are computed on the assumption that the catalyst contains 50% voids and neglecting both the pressure drop through the catalyst and the increase in volume which occurs during the reaction.

While we prefer to employ the shortest possible contact time consistent with a substantial conversion of the diaryl substituted paraffin to an ethylenic compound it has been found to be desirable in many instances to convert only a few percent of the aliphatic compound fed to the catalyst in one pass. By recirculating the unconverted diaryl substitute paraffin from 1 to 5 times or more a high yield is obtainable.

One of the advantages of employing a short contact time with the catalyst is that the life of the catalyst is prolonged. With contact times of the order of 1 second or more, the catalyst may become fouled in a relatively short period of time due to the deposition of carbaceous material on the surface thereof. When it is necessary or desirable to reactivate the catalyst this may be done by passing heated air, preferably mixed with steam or carbon dioxide, over the catalyst. The temperature of the air and steam mixture should be raised to about 500° to 650° C. The air enables the carbon to burn whereas the steam or carbon dioxide which is used in conjunction with the air keeps the temperature from rising too high which might cause a reduction in the activity of the catalyst. Generally at temperatures of about 500° C. the carbon begins to burn off and the heat of this reaction may cause the temperature to rise without the application of any external heat.

It may be seen that the proximity of the reactivation temperature to the reaction temperature greatly simplifies the change from normal operation to reactivation and back to normal operation. Since the normal active life of the catalyst exceeds the time required for its reactivation the operation of two or more converters in parallel is readily accomplished. The short time of reactivation enables one to keep one or more converters in normal operation while one or more other converters are being reactivated.

The process may be operated at elevated or reduced pressure if desired but pressures at about atmospheric are most suitable. If the diaryl substituted paraffin which is to be used in accordance with the present processes is not readily volatile at ordinary pressures, reduced pressures may be used to facilitate the operation of the process.

We claim:

1. A process which comprises mixing a substance selected from the class consisting of diaryl substituted paraffins having at least two carbon atoms in the paraffin chain and in which both aryl groups are attached to the same carbon atom and their nuclear substituted derivatives with water vapor as a diluent, contacting the resulting mixture thereof with a metal chromite catalyst, said metal having an atomic number from 23 to 29, inclusive, and maintaining the temperature of said mixture at a temperature of about 400° C.–650° C. during the time it is in contact with said catalyst.

2. In a method of producing a diaryl substituted ethylenic compound, the step which comprises contacting an asymmetric diarylethane in admixture with water vapor with a copper chromite catalyst at a temperature of about 400° C.–650° C. and for a contact time of less than 0.5 second.

3. In a method of producing a diaryl substituted ethylenic compound, the step which comprises contacting an asymmetric diarylethane in admixture with water vapor with a nickel chromite catalyst at a temperature of about 400° C.–650° C. and for a contact time of less than 0.5 second.

4. A process as in claim 1 wherein said catalyst is supported on a carrier.

5. In a process as in claim 2, the step recited wherein the catalyst is supported on an alumina carrier.

6. In a process as in claim 3, the step recited wherein the catalyst is supported on an alumina carrier.

JAMES KENNETH DIXON.
DONALD R. MAY.

REFERENCES CITED

The following references are of record in the file of this patent:

UNITED STATES PATENTS

| Number | Name | Date |
|---|---|---|
| 2,184,235 | Groll | Dec. 19, 1939 |
| 2,205,141 | Heard | June 18, 1940 |
| 2,353,624 | Ruthruff | July 11, 1944 |
| 2,373,982 | Sturrock et al. | Apr. 17, 1945 |

OTHER REFERENCES

Li Chem. Abs., vol. 37, 4718 (1943) in Patent Office Library.

Scheibley et al., Jour. Am. Chem. Soc., vol. 62, 840–1 (1940).